US006639399B2

(12) United States Patent
Schroeder et al.

(10) Patent No.: US 6,639,399 B2
(45) Date of Patent: Oct. 28, 2003

(54) TARGET WHEEL SENSOR ASSEMBLY FOR DETERMINING POSITION AND DIRECTION OF MOTION OF A ROTATING TARGET WHEEL

(75) Inventors: Thaddeus Schroeder, Rochester Hills, MI (US); Bruno Patrice Bernard, Troy, MI (US); Avoki M. Omekanda, Rochester, MI (US)

(73) Assignee: Delphi Technologies, Inc., Troy, MI (US)

( * ) Notice: Subject to any disclaimer, the term of this patent is extended or adjusted under 35 U.S.C. 154(b) by 12 days.

(21) Appl. No.: 09/777,764

(22) Filed: Feb. 6, 2001

(65) Prior Publication Data

US 2002/0105322 A1 Aug. 8, 2002

(51) Int. Cl.[7] .................. G01B 7/30; G01P 3/488; G01P 13/00; G01D 5/14
(52) U.S. Cl. ............... 324/207.25; 324/165; 324/174; 324/207.2; 324/207.21
(58) Field of Search ............... 324/163, 165, 324/166, 173, 174, 207.2, 207.21, 207.22, 207.25

(56) References Cited

U.S. PATENT DOCUMENTS

| 4,725,776 | A | * | 2/1988 | Onodera et al. | ....... 324/207.21 |
| 5,021,736 | A | * | 6/1991 | Gonsalves et al. | .. 324/207.21 X |
| 5,210,489 | A | * | 5/1993 | Petersen | ............ 324/207.21 X |
| 5,371,460 | A | * | 12/1994 | Coffman et al. | ............ 324/165 |
| 5,614,821 | A | * | 3/1997 | Leiderer | ............... 324/207.2 X |
| 5,801,529 | A | * | 9/1998 | Umemoto et al. | .. 324/207.21 X |
| 6,064,198 | A | * | 5/2000 | Wolf et al. | ............... 324/207.2 |
| 6,087,827 | A | | 7/2000 | Oudet | .................... 324/207.12 |
| 6,140,813 | A | * | 10/2000 | Sakanoue et al. | ............ 324/174 |
| 6,404,188 | B1 | * | 6/2002 | Ricks | ..................... 324/165 X |

FOREIGN PATENT DOCUMENTS

| DE | 19630108 | | 1/1998 |
| DE | 19701927 | | 6/1998 |
| DE | 19814758 | | 10/1999 |
| JP | 9-229614 | * | 9/1997 |

* cited by examiner

Primary Examiner—Gerard R. Strecker
(74) Attorney, Agent, or Firm—Margaret A. Dobrowitsky

(57) ABSTRACT

A target wheel sensor assembly includes a target wheel, a magnet, and a sensing element placed therebetween. The magnet and the sensing element are configured so that as the target wheel rotates the sensing element outputs an asymmetric signal. This asymmetric signal is used to determine the position of the target wheel as it rotates and the direction of motion of the target wheel.

5 Claims, 2 Drawing Sheets

TARGET WHEEL SENSOR ASSEMBLY FOR DETERMINING POSITION AND DIRECTION OF MOTION OF A ROTATING TARGET WHEEL

TECHNICAL FIELD

The present invention relates to motor vehicle sensors and actuators.

BACKGROUND OF THE INVENTION

Modern motor vehicles are equipped with numerous sensors which provide detailed information regarding the operation of the vehicle. This information may be displayed for a driver or it may be processed and provided to various vehicle control systems. A target wheel sensor, for example, may be used to determine the angular speed or angular position of a rotating part in the vehicle, e.g., a crankshaft and a driveshaft. In either case, a target wheel may be engaged with the rotating part for inducing signals in one or more sensors positioned next to the target wheel, with the signals representing the angular position or angular speed of the rotating part. These signals can be used in various control systems, e.g., an ignition system and a speed control system.

The present invention recognizes that certain applications require the detection of not only the position of the target wheel, but the detection of the direction of motion of the target wheel as well. Devices have been provided that can be used to detect the position of the target wheel and the direction of motion. These devices typically require a first sensor and a second sensor placed at a predetermined angular distance from each other around a target wheel. Unfortunately, the need for a second sensor, and thus, a second coil, increases the cost of the device.

The present invention has recognized these prior art drawbacks, and has provided the below-disclosed solutions to one or more of the prior art deficiencies.

SUMMARY OF THE INVENTION

A target wheel sensor assembly includes a target wheel, one magnet, and one sensing element placed there between. The magnet and the sensing element are configured so that as the target wheel rotates it causes the sensing element to output an asymmetric signal.

In one aspect of the present invention, the sensor assembly defines a central axis, and the magnet and the sensing element are oriented perpendicular to the central axis. In this aspect, the magnet generates a magnetic field that is oriented at an angle with the central axis. Preferably, the angle is in a range of twenty degrees to seventy degrees (20°–70°).

In another aspect of the present invention, the sensor assembly defines a central axis, and the magnet is oriented perpendicular to the central axis. In this aspect, the magnet generates a magnetic field that is oriented parallel to the central axis. Moreover, the sensing element is oriented at an angle with the central axis. Preferably, the angle is in a range of zero degrees to seventy degrees (0°–70°).

In yet another aspect of the present invention, the sensor assembly defines a central axis, and the magnet and the sensing element are oriented perpendicular to the central axis. The magnet generates a magnetic field that is oriented parallel to the central axis. In this aspect, the magnet is centered on the central axis, and the sensing element is placed a distance from the central axis. The magnet defines a length and preferably, the distance is in a range of forty percent to one hundred percent (40%–100%) of one-half of the length.

In yet still another aspect of the present invention, the sensor assembly defines a central axis. The magnet defines a long axis and generates a magnetic field that is oriented perpendicular to the long axis. Moreover, the sensing element is oriented parallel to the long axis of the magnet. In this aspect, the magnet and the sensing element are oriented at an angle with the central axis. Preferably, the angle is in a range of one degree to forty degrees (1°–40°).

In another aspect of the present invention, the sensor assembly includes a magnetic piece placed near the magnet. The magnetic piece is configured so that as the target wheel rotates, it causes the sensing element to output an asymmetric signal.

In still another aspect of the present invention, the sensor assembly defines a central axis. In this aspect, the magnet defines a lower surface that is oriented perpendicular to the central axis and an upper surface that is oriented at an angle with the central axis.

In yet another aspect of the present invention, the magnet generates a first magnetic field and a second magnetic field. Preferably, the magnetic fields have different strengths.

In yet still another aspect of the present invention, a target wheel sensor assembly includes a target wheel, one magnet placed near the target wheel, and one sensing element placed between the target wheel and the magnet. In this aspect, the sensing element senses a position of the target wheel and a direction of motion of the target wheel as the target wheel rotates.

The present invention will now be described, by way of example, with reference to the accompanying drawings, in which:

DESCRIPTION OF AN EMBODIMENT OF THE INVENTION

Figure 1:
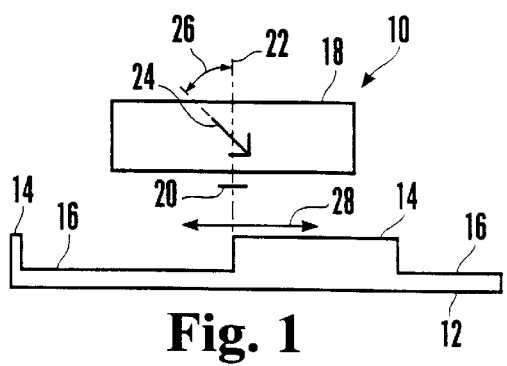
FIG. 1 is a plan view of a target wheel sensor assembly.

Referring initially to FIG. 1, a target wheel sensor assembly is shown and generally designated 10. FIG. 1 shows that the sensor assembly 10 includes a preferably magnetic target wheel 12 that is alternatingly formed with plural teeth 14 and plural slots 16. A preferably permanent magnet 18 is placed just beyond the outer periphery of the target wheel 12. Moreover, a sensing element 20, e.g., a Hall sensor or magnetoresistor (MR), is placed between the target wheel 12 and the magnet 18.

As shown in FIG. 1, the sensor assembly 10 defines a central axis 22 with which the center of the magnet 18, the center of the sensing element 20, and the center of the target wheel 12 are aligned. Moreover, the magnet 18 and the sensing element 20 are placed so that they are perpendicular to the central axis 22. FIG. 1 shows that the magnet 18 generates a magnetic field as indicated by arrow 24. As shown, the magnet 18 is magnetized such that the magnetic field 24 is at an angle 26 with the central axis 22. In a preferred embodiment, the angle of magnetization 26 is in a range from twenty degrees to seventy degrees (20°–70°).

As the target wheel 12 rotates, the teeth 14 move past the sensing element 20, as indicated by direction arrow 28, and alter the magnetic field 24 sensed by the sensing element 20. Accordingly, the configuration of the sensor assembly 10, i.e., the angle of magnetization 26 of the magnet 18, causes the sensing element 20 to output an asymmetric signal, described below.

Figure 2:
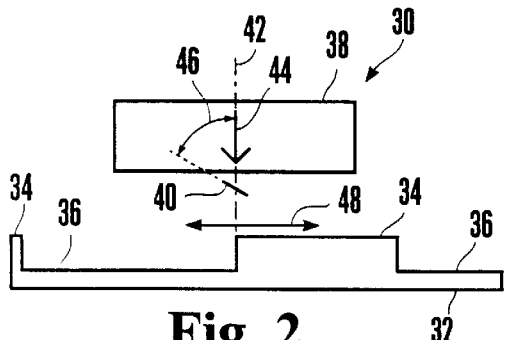
FIG. 2 is a plan view of a first alternate sensor assembly.

FIG. 2 shows a first alternative target wheel sensor assembly generally designated 30. As shown in FIG. 2, the sensor assembly 30 includes a magnetic target wheel 32 that is alternatingly formed with plural teeth 34 and plural slots 36. A permanent magnet 38 is placed just beyond the outer periphery of the target wheel 32. Moreover, a sensing element 40, e.g., a Hall sensor or magnetoresistor (MR), is placed between the target wheel 32 and the magnet 38.

As shown in FIG. 2, the sensor assembly 30 defines a central axis 42 with which the center of the magnet 38, the center of the sensing element 40, and the center of the target wheel 32 are aligned. Moreover, the magnet 38 is placed so that it is perpendicular to the central axis 42. FIG. 2 shows that the magnet 38 generates a magnetic field as indicated by arrow 44. As shown, the magnet 18 is magnetized such that the magnetic field 44 is parallel to the central axis 42. The sensing element 40 is placed so that it defines an angle 46 with the central axis 42 and the magnetic field 44. Preferably, the sensing element angle 46 is in a range from zero degrees to seventy degrees (0°–70°).

As the target wheel 32 rotates, the teeth 34 move past the sensing element 40, as indicated by direction arrow 48, and alter the magnetic field 44 sensed by the sensing element 40. Accordingly, the configuration of the sensor assembly 30, i.e., the placement of the sensing element 40 at an angle 46 with the magnetic field 44, causes the sensing element 40 to output an asymmetric signal, described below.

Figure 3:
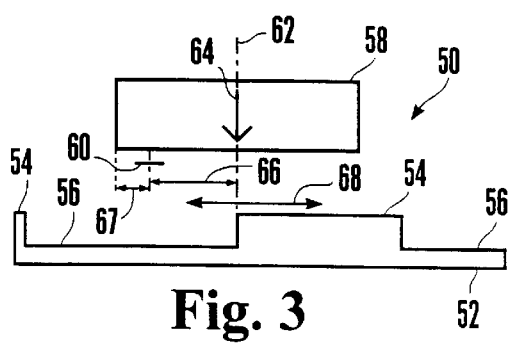
FIG. 3 is a plan view of a second alternative sensor assembly.

Referring now to FIG. 3, a second alternative sensor is shown and generally designated 50. FIG. 3 shows that the sensor assembly 50 includes a magnetic target wheel 52 that is alternatingly formed with plural teeth 54 and plural slots 56. A permanent magnet 58 is placed just beyond the outer periphery of the target wheel 52. Moreover, a sensing element 60, e.g., a Hall sensor or magnetoresistor (MR), is placed between the target wheel 52 and the magnet 58.

As shown in FIG. 3, the sensor assembly 50 defines a central axis 62 with which the center of the magnet 58 and the center of the target wheel 12 are aligned. Moreover, the magnet 58 is placed so that it is perpendicular to the central axis 62. FIG. 3 shows that the magnet 58 generates a magnetic field as indicated by arrow 64. The sensing element 60 is placed so that its center is offset from the center of the magnet 58. More specifically, the center of the sensing element 60 is located a distance 66 from the center of the magnet 64 and a distance 67 from the edge of the magnet 64. Preferably, the distance 66 from the center of the magnet is in a range from forty percent to one hundred percent (40%–100%) of half the length of the magnet 58. In this embodiment of the sensor assembly 50, the preferred length of the magnet is at least five millimeters (5 mm).

As the target wheel 52 rotates, the teeth 54 move past the sensing element 60, as indicated by direction arrow 68, and alter the magnetic field 64 sensed by the sensing element 60. Accordingly, the configuration of the sensor assembly 50, i.e., the placement of the sensing element 60 so that its center is offset from the center of the magnet 58, causes the sensing element 60 to output an asymmetric signal, described below.

Figure 4:
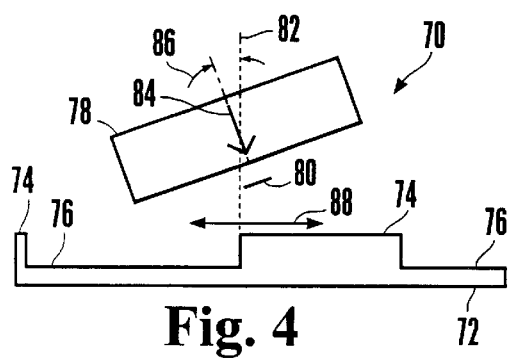
FIG. 4 is a plan view of a third alternative sensor assembly.

FIG. 4 shows yet a third alternative sensor generally designated 70. As shown in FIG. 4, the sensor assembly 70 includes a magnetic target wheel 72 that is alternatingly formed with plural teeth 74 and plural slots 76. A permanent magnet 78 is placed just beyond the outer periphery of the target wheel 72. Moreover, a sensing element 80, e.g., a Hall sensor or magnetoresistor (MR), is placed between the target wheel 72 and the magnet 78.

As shown in FIG. 4, the sensor assembly 70 defines a central axis 82 with which the center of the magnet 78 and the center of the target wheel 72 are aligned. FIG. 4 shows that the magnet 18 generates a magnetic field, as indicated by arrow 24, that is perpendicular to the length of the magnet 78. The sensing element 80 is placed so that it is parallel to the length of the magnet 78. As shown, the magnet 78 and the sensing element 80 are placed at an angle 86 with the central axis 22. In a preferred embodiment, the placement angle 86 is in a range from one degree to forty degrees (1°–40°).

As the target wheel 72 rotates, the teeth 74 move past the sensing element 80, as indicated by direction arrow 88, and alter the magnetic field 84 sensed by the sensing element 80. Accordingly, the configuration of the sensor assembly 70, i.e., the placement angle 86 of the magnet 78 and the sensing element 80 with respect to the central axis 86, causes the sensing element 80 to output an asymmetric signal, described below.

Figure 5:
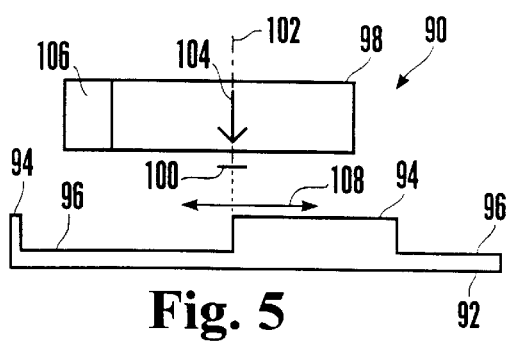
FIG. 5 is a plan view of a fourth alternative sensor assembly.

Referring now to FIG. 5, a fourth alternative of the target wheel sensor assembly is shown and generally designated 90. FIG. 5 shows that the sensor assembly 90 includes a magnetic target wheel 92 that is alternatingly formed with plural teeth 94 and plural slots 96. A permanent magnet 98 is placed just beyond the outer periphery of the target wheel 92. Moreover, a sensing element 100, e.g., a Hall sensor or magnetoresistor (MR), is placed between the target wheel 92 and the magnet 98.

As shown in FIG. 5, the sensor assembly 90 defines a central axis 102 with which the center of the magnet 98, the center of the sensing element 100, and the center of the target wheel 92 are aligned. Moreover, the magnet 98 and the sensing element 100 are placed so that they are perpendicular to the central axis 102. FIG. 5 shows that the magnet 98 generates a magnetic field, as indicated by arrow 104, that is parallel to the central axis 102. As shown, the magnet 98 is flanked on one edge by a preferably steel, magnetic piece 106 having a generally rectangular cross-section.

As the target wheel 92 rotates, the teeth 94 move past the sensing element 100, as indicated by direction arrow 108, and alter the magnetic field 104 sensed by the sensing element 100. Accordingly, the configuration of the sensor assembly 90, i.e., the magnetic piece 106 that flanks the magnet 98, alters the return path of the magnetic field 104 and causes the sensing element 100 to output an asymmetric signal, described below.

Figure 6:
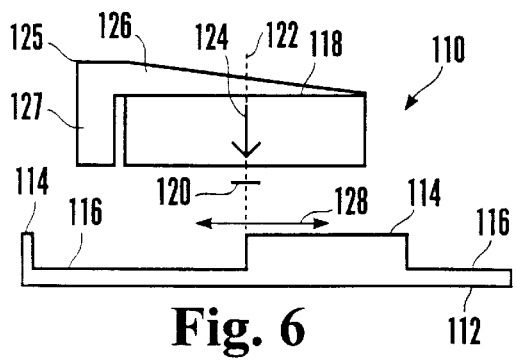
FIG. 6 is a plan view of a fifth alternative sensor assembly.

FIG. 6 shows a fifth alternative target wheel sensor assembly generally designated 110. As shown in FIG. 6, the sensor assembly 110 includes a magnetic target wheel 112 that is alternatingly formed with plural teeth 114 and plural slots 116. A permanent magnet 118 is placed just beyond the outer periphery of the target wheel 112. Moreover, a sensing element 120, e.g., a Hall sensor or magnetoresistor (MR), is placed between the target wheel 112 and the magnet 118.

As shown in FIG. 6, the sensor assembly 110 defines a central axis 122 with which the center of the magnet 118, the center of the sensing element 120, and the center of the target wheel 112 are aligned. Moreover, the magnet 118 and the sensing element 120 are placed so that they are perpendicular to the central axis 122. FIG. 6 shows that the magnet 118 generates a magnetic field, indicated by arrow 24, that is parallel to the central axis 122. As shown, a magnetic piece 125, that includes an upper portion 126 and a lateral portion 127 extending therefrom, is placed around the magnet 118. Preferably, the upper portion 126 of the magnetic piece 125 is tapered. Moreover, the lateral portion has a generally rectangular cross-section. The tapered upper portion 126 is placed adjacent to the top of the magnet 118 and the lateral portion 127 flanks one side of the magnet 118.

As the target wheel 112 rotates, the teeth 114 move past the sensing element 120, as indicated by direction arrow 128, and alter the magnetic field 124 sensed by the sensing element 120. Accordingly, the configuration of the sensor assembly 10, i.e., the magnetic piece 125 placed around the magnet, causes the sensing element 120 to output an asymmetric signal, described below. More specifically, the magnetic piece 125 alters the return path of the magnetic field 124 which causes the sensing element 120 to output the asymmetric signal.

Figure 7:
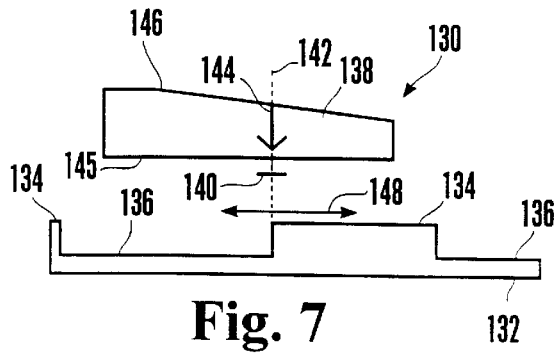
FIG. 7 is a plan view of a sixth alternative sensor assembly.

FIG. 7 shows still a sixth alternative target wheel sensor assembly generally designated 130. As shown in FIG. 7, the sensor assembly 130 includes a magnetic target wheel 132 that is alternatingly formed with plural teeth 134 and plural slots 136. A permanent magnet 138 is placed just beyond the outer periphery of the target wheel 132. Moreover, a sensing element 140, e.g., a Hall sensor or magnetoresistor (MR), is placed between the target wheel 132 and the magnet 138.

As shown in FIG. 7, the sensor assembly 130 defines a central axis 142 with which the center of the magnet 138, the center of the sensing element 140, and the center of the target wheel 132 are aligned. The magnet 138 generates a magnetic field, indicated by arrow 144, that is parallel to the central axis 142. FIG. 7 shows that the magnet 138 defines a lower surface 145 that is perpendicular to the central axis 142 and an upper surface 146 that is at an angle with respect to the lower surface 145 and the central axis 142. Thus, as shown, the magnet 138 is tapered from one end to the other.

As the target wheel 132 rotates, the teeth 134 move past the sensing element 140, as indicated by direction arrow 148, and alter the magnetic field 144 sensed by the sensing element 140. Accordingly, the configuration of the sensor assembly 130, i.e., the tapered shape of the magnet 138, causes the sensing element 140 to output an asymmetric signal, described below.

Figure 8:
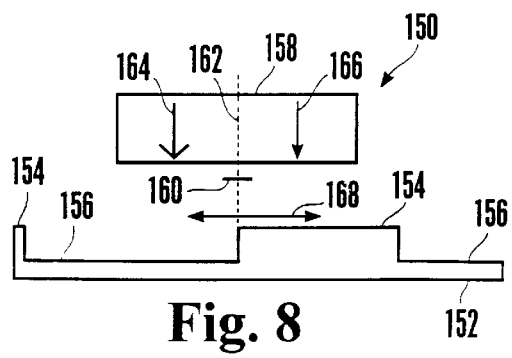
FIG. 8 is a plan view of a seventh alternative sensor assembly.

Referring to FIG. 8, a seventh alternative target wheel sensor assembly is shown and generally designated 150. FIG. 8 shows that the sensor assembly 150 includes a magnetic target wheel 152 that is; alternatingly formed with plural teeth 154 and plural slots 156. A permanent magnet 158 is placed just beyond the outer periphery of the target wheel 152. Moreover, a sensing element 160, e.g., a Hall sensor or magnetoresistor (MR), is placed between the target wheel 152 and the magnet 158.

As shown in FIG. 8, the sensor assembly 150 defines a central axis 162 with which the center of the magnet 158, the center of the sensing element 160, and the center of the target wheel 152 are aligned. Moreover, the magnet 158 and the sensing element 160 are placed so that they are perpendicular to the central axis 162. FIG. 8 shows that the magnet 158 generates a relatively strong magnetic field to one side of the central axis 162, indicated by arrow 164, and a relatively weak magnetic field to the other side of the central axis 162, indicated by arrow 166. As shown, the magnet 158 is magnetized so that the magnetic fields 164, 166 are parallel to the central axis 162. It is to be appreciated that the differing magnetic fields 164, 166 may be produced, e.g., by an ad hoc magnetization process or by selectively demagnetizing a normally magnetized magnet. Such a partial demagnetization can be achieved, e.g., by local heating of the magnet material with a laser beam or other means.

As the target wheel 152 rotates, the teeth 154 move past the sensing element 160, as indicated by direction arrow 168, and alter the magnetic fields 164, 166 sensed by the sensing element 160. Accordingly, the configuration of the sensor assembly 150, i.e., the differing strengths of the magnetic fields 164, 166 produced by the magnet 158, causes the sensing element 160 to output an asymmetric signal, described below.

Figure 9:
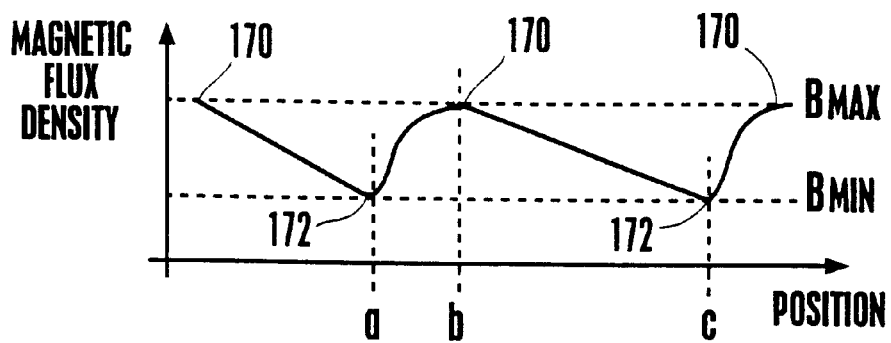
FIG. 9 is a graph of the magnetic flux density sensed by the sensing element versus the target wheel position.

FIG. 9 shows a graph, applicable to each sensor assembly described above, of the magnetic flux density sensed by the sensing element 20, 40, 60, 80, 100, 120, 140, 160 versus the position of the target wheel 12, 32, 52, 72, 92, 112, 132, 152. FIG. 9 shows that the magnetic flux density asymmetrically cycles between a maximum value 170 and a minimum value 172 without crossing the zero axis. As shown, the slope of the graph leading to the maximum value 170 and the slope of the graph leading to the minimum value 172 are distinctly different. Thus, the configuration of sensor assembly 10, 30, 50, 70, 90, 110, 130, 150 causes the sensing element 20, 40, 60, 80, 100, 120, 140, 160 to produce an output that is asymmetric. This asymmetric signal can be used to not only determine the position of the target wheel 14, but also its direction of motion.

Figure 10:
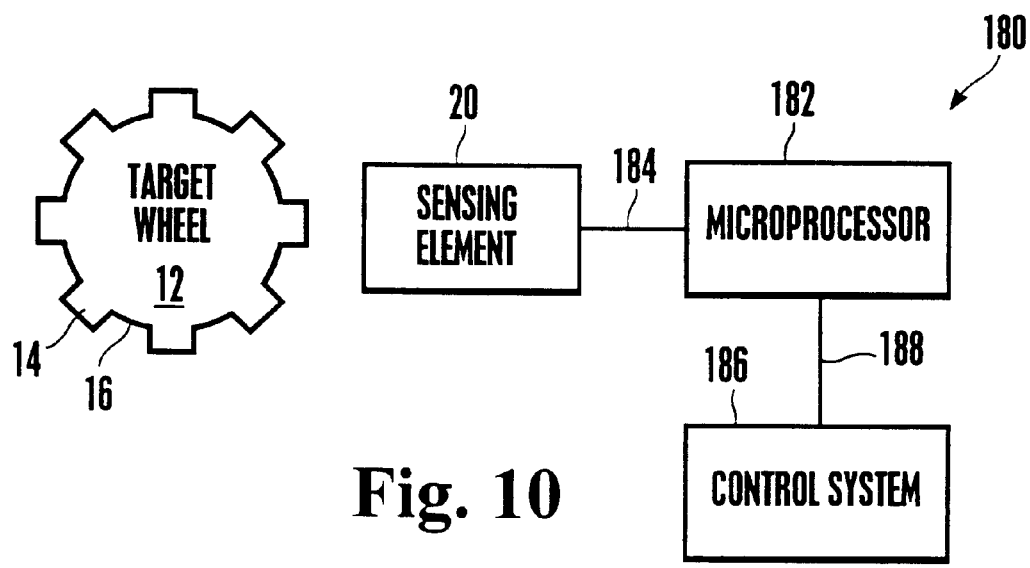
FIG. 10 is a block diagram of a system in which the present invention can be incorporated.

Referring now to FIG. 10, a system in which the present invention can be incorporated is shown and generally designated 180. FIG. 10 shows that the system includes a target wheel, e.g., the target wheel 12 shown in FIG. 1 and described above, and a sensing element, e.g., the sensing element 20 shown in FIG. 1 and described above. The sensing element 20 is connected to a microprocessor 182 via electric line 184. In turn, the microprocessor 182 is connected to a control system 186 by electric line 188. Accordingly, the microprocessor 182 receives an asymmetric signal from the sensing element 20 and determines the position of the target wheel 12 and its direction of motion based thereon. Specifically, as stated above, and as clearly shown in FIG. 9, the slope of the asymmetric signal is distinctly different on one side of a peak (i.e., a maximum value) than it is on the other side of a peak. The microprocessor 182 can use the different slopes to determine the direction of motion. For example, the microprocessor 182 can determine the direction of rotation by measuring the time required to for the amplitude of the asymmetric signal to change by a predetermined value. The position can be determined by simply counting the peaks. The microprocessor 182 can then output a signal representing the position of the target wheel and the direction of motion of the target wheel to the control system 186.

With the configuration of structure described above, it is to be appreciated that the target wheel sensor assembly 10, 30, 50, 70, 90, 110, 130, 150 can be used to determine the position and direction of motion of a rotating target wheel 12, 32, 52, 72, 92, 112, 132, 152 using only a single sensing element 20, 40, 60, 80, 100, 120, 140, 160. It is also to be appreciated that several of the embodiments described above can be combined with other embodiments described above to yield a target wheel sensor assembly that outputs an asymmetric signal. For example, features of the embodiment shown in FIG. 1 may be combined with features of the embodiment shown in FIG. 2 to yield another target wheel sensor assembly.

While the particular TARGET WHEEL SENSOR ASSEMBLY as herein shown and described in detail is fully capable of attaining the above-described objects of the invention, it is to be understood that it is the presently preferred embodiment of the present invention and thus, is representative of the subject matter which is broadly contemplated by the present invention, that the scope of the present invention fully encompasses other embodiments which may become obvious to those skilled in the art, and that the scope of the present invention is accordingly to be limited by nothing other than the appended claims, in which reference to an element in the singular is not intended to mean "one and only one" unless explicitly so stated, but rather "one or more." All structural and functional equivalents to the elements of the above-described preferred embodiment that are known or later come to be known to those of ordinary skill in the art are expressly incorporated herein by reference and are intended to be encompassed by the present claims. Moreover, it is not necessary for a device or method to address each and every problem sought to be solved by the present invention, for it is to be encompassed by the present claims. Furthermore, no element, component, or method step in the present disclosure is intended to be dedicated to the public regardless of whether the element, component, or method step is explicitly recited in the claims. No claim element herein is to be construed under the provisions of 35 U.S.C. section 112, sixth paragraph, unless the element is expressly recited using the phrase "means for."

What is claimed is:

1. A target wheel sensor assembly defining a central axis, the sensor assembly, comprising:
    a target wheel defining a center, the center of the target wheel being located along the central axis;
    one and only one magnet having opposite poles and defining a center substantially midway between the poles, the center of the magnet being located along the central axis;
    one and only one sensing element placed between the target wheel and the magnet, the sensing element defining a center, the center of the sensing element being offset from the central axis, the sensing element outputting an asymmetric signal in response to sensing structure on the target wheel as the target wheel rotates; and
    at least one processor determining a position of the target wheel at least in part based on the asymmetric signal from the one and only one sensing element.

2. The sensor assembly of claim 1, wherein the magnet and the sensing element are oriented perpendicular to the central axis, the magnet generating a magnetic field that is oriented parallel to the central axis.

3. The sensor assembly of claim 2 wherein the magnet defines a length and the center of the sensing element is placed a distance from the central axis that is in a range of forty percent to one hundred percent (40%–100%) of one-half of the length of the magnet.

4. A target wheel sensor assembly defining a central axis, the sensor assembly, comprising:
    a target wheel defining a center, the center of the target wheel being located along the central axis;
    one and only one magnet placed near the target wheel, the magnet defining a center intermediate opposite poles of the magnet, the center of the magnet being located along the central axis; and
    one and only one sensing element placed between the target wheel and the magnet, at least a geometric center of the sensing element being distanced from the central axis, the sensing element sensing structure on the target wheel to output an asymmetric signal useful for determining both a position of the target wheel and a direction of motion of the target wheel as the target wheel rotates.

5. The sensor assembly of claim 4 wherein the magnet and the sensing element are oriented perpendicular to the central axis, the magnet generating a magnetic field that is oriented parallel to the central axis, the magnet being centered on the central axis, and wherein the sensing element is placed a distance from the central axis.

* * * * *